United States Patent [19]

Murphy et al.

[11] Patent Number: 5,278,844
[45] Date of Patent: Jan. 11, 1994

[54] METHOD AND APPARATUS FOR DIGITAL AUDIO BROADCASTING AND RECEPTION

[75] Inventors: John L. Murphy, San Francisco; Mark J. Rich, Menlo Park, both of Calif.

[73] Assignee: USA Digital Radio, Los Angeles, Calif.

[21] Appl. No.: 683,918

[22] Filed: Apr. 11, 1991

[51] Int. Cl.$^5$ .................... G06F 11/08; H04L 1/04
[52] U.S. Cl. .................... 371/37.1; 375/53; 375/83
[58] Field of Search .......... 371/37.1, 43; 375/52, 375/53, 83, 100

[56] References Cited

U.S. PATENT DOCUMENTS

| | | | |
|---|---|---|---|
| 3,988,677 | 10/1976 | Fletcher | 371/45 X |
| 4,020,461 | 4/1977 | Adams | 371/37.1 |
| 4,074,230 | 2/1978 | Icenbice | 371/37.1 |
| 4,077,021 | 2/1978 | Csajka | 371/43 X |
| 4,213,094 | 7/1980 | Wood | 375/53 X |
| 4,945,549 | 7/1990 | Simon | 375/53 |
| 4,980,897 | 12/1990 | Decker | 375/38 |
| 5,023,889 | 7/1991 | Divsalar | 371/43 X |
| 5,048,057 | 9/1991 | Saleh | 375/58 X |
| 5,056,112 | 10/1991 | Wei | 371/43 |

*Primary Examiner*—Robert W. Beausoliel, Jr.
*Assistant Examiner*—Glenn Snyder
*Attorney, Agent, or Firm*—Townsend and Townsend Khourie and Crew

[57] ABSTRACT

A radio broadcasting system is provided for transmitting and receiving through free space a fully coherent multicarrier modulated digital signal which is especially adapted to be resistive to multipath degradation. The multicarrier modulated signal is a synthesized vector-modulated signal which is a quadrature phase shift keyed (QPSK) modulated set of synthesized carriers phase coherent with each other and each occupying a spectrum replicated multiple times within a bandwidth with no more than two bits per vector. An efficient channel coding consisting of large block size, high efficiency block coding, such as BCH 255, 239 code, is employed in connection with time interleaving of bits to mitigate the effects of frequency selective multipath and broadband multipath. The broadcast system is designed to be used in support of compressed digital audio programming material. In a demodulation process according to the invention, a demodulator is operative to phase lock to a reconstructed or otherwise coherent pilot tone or equivalent clock, to coherently demodulate the digital signal, to deinterleave, to decode the block encoded signal and to format the recovered data stream for source decoding.

17 Claims, 3 Drawing Sheets

METHOD AND APPARATUS FOR DIGITAL AUDIO BROADCASTING AND RECEPTION

CROSS-REFERENCE TO RELATED APPLICATIONS

This application is related to U.S. patent application Ser. No. 07/684,529 filed Apr. 11, 1991 and to U.S. patent application Ser. No. 07/683,945 filed Apr. 11, 1991, both entitled METHOD AND APPARATUS FOR DIGITAL AUDIO BROADCASTING AND RECEPTION.

BACKGROUND OF THE INVENTION

This invention relates generally to the field of digital broadcast communication through the medium of free space, and more particularly, to the field of digital audio broadcasting in spectral regions relying on line-of-sight communications subject to signal fade due to multipath propagation.

In recent years, the quality of commercial audio broadcast signals as delivered by radio transmitters through free space has been eclipsed by the quality of stored program material such as compact digital audio disk technology and digital audio tape technology. The quality differential of stored program material over conventional analog frequency modulated broadcasting is so great that there has been a market shift in listener preference to stored program material. In the past, commercial frequency modulated broadcast signals were considered comparable in quality to stored program material. However, the increase in quality of stored program material and the degradation in fm signal quality, particularly in urban areas, has resulted in a differential in quality that is reflected in decrease in listenership and substantial revenue loss to broadcasters.

One of the reasons for degradation in quality of fm signals is the inherent problems with line of sight propagation of radio signals. Radio signals are subject to interference and fading from specularly-reflected copies of the signal, both narrow-band and broadband. The interference is commonly referred to as multipath. Multipath results in fade which is dependent upon frequency, time and spatial factors. However, a free space signal is generally unaffected by group delay, which is generally associated with other types of media such as copper wires, coaxial cables, fiber optics and waveguides. A careful analysis of the propagation problem in connection with other limiting factors, such as other available spectrum and compatibility with other broadcast services, has revealed that no system exists or is even been suggested as suitable to address the problem of delivering a high-quality broadcast signal of sufficient efficiency and practicality to be commercially viable.

One digital audio broadcasting scheme promoted as potentially viable is designated the Eureka 147 Project. Based on an implementation in the 1500 Hz microwave L-band, the Eureka 147 system proposes a single-transmitter, thirty-three channel system having a 7 MHz bandwidth and relying on an error-correcting convolutional encoding and decoding scheme. Implementation of such a system would involve substantial economic dislocation within the U.S. broadcast market and further, would require that the power be as much as 500 times higher than current analog broadcasting system power to operate comparably at the frequencies of interest. Of technical interest, the Eureka 147 system as proposed would not be able to share spectrum with any other broadcast service, and the use of the system would require that there be a central transmitter in each market and thus that each market be limited to thirty-three channels. The scheme, as proposed, is not particularly spectrum efficient, requiring guard bands between channels to mitigate against intersymbol interference. The system is intended to be multipath resistant. To this end there is a broad spectrum allocation of 7 MHz and a digitally-based error correction scheme.

The problem of reliable transmission and reception in the presence of severe multipath propagation has been explored in the past. For example, Cimini, Jr., reports in a paper entitled "Analysis and Simulation of a Digital Mobile Channel Using Orthogonal Frequency Division Multiplexing," *IEEE Transactions on Communications.* Vol. COM-33, No. 7, pp. 665-675 (July 1985), that broadband, narrow-band and time-dependent multipath problems in a harsh mobile environment are a substantial challenge to solve. The problems addressed therein presuppose the application of speech/data transmission on a frequency carrier at 850 MHz. Simulations were performed based on orthogonal frequency division multiplexing (a plurality of subcarriers or multitone modulation) with the 7.5 kHz channel bandwidth. Detection was based on coherent detection using one or more pilot signals transmitted in the same manner and at the same amplitude as the information signals. It was assumed that the co-channel interference would be at least 17 dB below the information carrier signals. Cimini identified that reliable retrieval of pilot signals is essential for accurate coherent detection and correction of data. Proposed specifically was a dual pilot system with interpolation in frequency between the pilots and orthogonal frequency division multiplexing wherein each tone is modulated by a quadrature phase shift keyed (QPSK) modulator. It was therein recognized that quadrature phase shift keying had a 3 dB advantage in gain over differential quadrature phase shift keyed modulation and detection.

Error correction techniques are well known for correcting errors in digitally-modulated information signals. The use of error correction techniques provide substantial advantage over conventional analog signaling because detection of less than a complete portion of the signal can still result in recovery of all of the information intended to be communicated. The exact form of error correction and encoding plays a significant role in the efficiency and integrity of the transmitted signal. It is important for example that the selected error correction technique be one which does not so degrade the channel efficiency as to render it impractical.

Multiple-channel digital transmission systems have been known in various environments. For example, the U.S. Military RAKE System is described in "Modern Communication Principles," by S. Stein and J. J. Jones (McGraw Hill, 1967). Other references on multi-channel digital transmission systems include: D. L. Nielson, "Microwave Propagation and Noise Measurements for Mobile Digital Radio Application," SRI Report for ARPA SRI Project 2325, NTIS No. ADB073934C (January 1975); W. W. Peterson, E. J. Weldon, Jr., *Error-Correction Codes,* MIT Press (1973); and Shu Lin, *An Introduction to Error-Correcting Codes,* Prentice Hall (1970).

Multiple-channel digital modulation techniques are also known and have been used in telephone line modem technology, such described in U.S. Pat. No. 4,206,320 to Keasler et al. (June 1980), U.S. Pat. No. 4,438,511 to Baran (March 1984), U.S. Pat. No. 4,601,045 to Lubarsky (July 1986) and U.S. Pat. No. 4,754,458 to Dornstetter (June 1988). The last-named patent is believed to describe a technology in the proposed Eureka 147 system. The Dornstetter patent describes the use of a digital modulation scheme capable of correcting certain types of errors and specifically, burst errors. The system uses convolutional coding and a decoding algorithm based on a Berlekamp-Massey algorithm. The error correction scheme is based on the calculation of coefficients of code words by obtaining polynomials from the factorization over a Galois field of elements. The result is a relatively inefficient use of bandwidth.

An instructive survey article on multicarrier modulation is by John A. C. Bingham, entitled "Multicarrier Modulation for Data Transmission: An Idea Whose Time Has Come," *IEEE Communications Magazine*, Vol. 28, No. 5, pp. 5-14 (May 1990). This article deals with many of the problems related to multicarrier modulation and identifies areas requiring further development. The principal focus of use of multicarrier modulation has, however, been in connection with communication through impaired channels, such as telephone lines. Frequently, in such environments, there is two-way communication to promote retransmission of lost information.

What is needed is a one-way (broadcast) transmission system which is efficient and sufficiently robust to be able to communicate high-fidelity audio program material in a manner which is compatible with existing U.S. broadcast services, particularly fm broadcast services.

SUMMARY OF THE INVENTION

According to the invention, a radio broadcasting system is provided for transmitting and receiving through free space a multicarrier modulated digital signal which is especially adapted to be resistive to multipath degradation in the frequency spectrum between about 80 MHz and 120 MHz. According to the invention, an efficient channel coding consisting of high efficiency block coding, based on a cyclic code, such as a Bose-Chaudhurei-Hocquengheim code (BCH code), which uses a large block size (over 200 bits), is employed in connection with time interleaving of bits to mitigate the effects of frequency selective multipath and broadband multipath. The digital multicarrier modulated signal is rendered fully coherent with itself by synthesizing the modulation and generation of tones using a vector modulation scheme. The resultant multicarrier modulated signal received at a broadcast receiver can be coherently demodulated by reference to a pilot tone or clock which is coherent with the signal. The pilot tone or clock may be derived from a reconstruction of the transmitted signal, or it may be provided from a separate source. The multicarrier modulated signal is phase locked to the pilot tone or an equivalent phase-coherent clock for coherent detection. Guard time and guard bands are eliminated, and the symbol intervals are of sufficient time duration to mitigate the effects of intersymbol interference due to reflective multipath delay. The broadcast system is designed to be used in support of compressed digital audio programming material. In a demodulation process according to the invention, a demodulator is operative to coherently demodulate the digital signal, optionally to equalize phase, to deinterleave, to decode the large-block-encoded signal and to format the recovered data stream for source decoding. Interleaving, frequency reuse and specific block encoding are operations which are dependent on tradeoffs in the level of required error recovery in the given environment. Interleaving for example provides time diversity which is useful for combating broadband short duration interference, and the encoding provides the desired level of error correction in exchange for reduced ratio in the size of the information block to the correction block. Coherent detection of large block codes provides the most efficient basic digital coding structure for accurate recovery of broadcast signals.

The invention will be better understood by reference to the following detailed description in connection with the accompanying drawings.

DESCRIPTION OF SPECIFIC EMBODIMENTS

Figure 1:
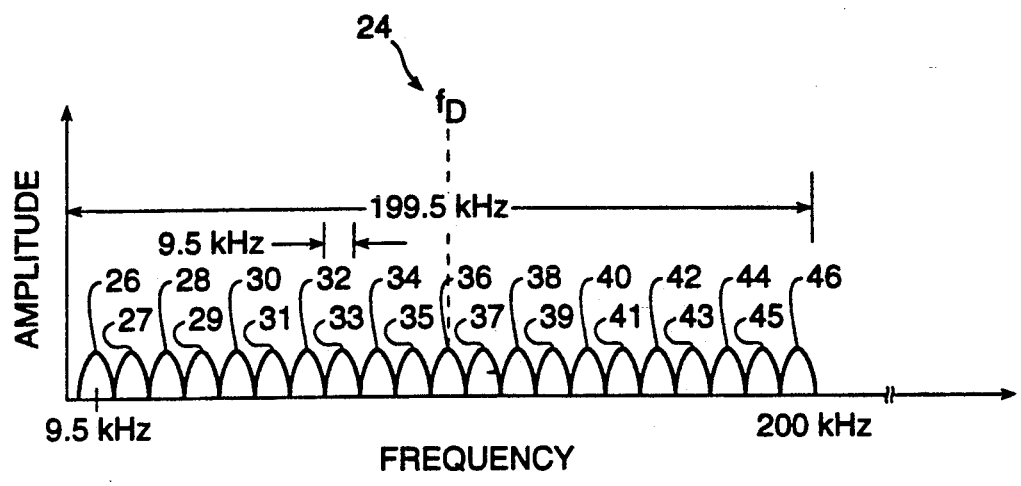
FIG. 1 is a graph of a digital baseband composite of one type of digital polyvector signal in accordance with the present invention.

In order to obtain a robust and high quality signal through a broadcast-type (one-way) communications channel, it is important to understand the characteristics of the channel. As a consequence, the approach herein has been to analyze the channel and then to devise a system optimized to the channel characteristics.

An analysis of available technical test data has indicated that the frequency spectrum between 80 MHz and 120 MHz, roughly the range used by commercial fm broadcasting stations within the United States of America and elsewhere, is subject primarily to multipath fading and only secondarily to any nonlinear effects in a free-space channel, Moreover, the channel characteristics of actual fm broadcast stations vary with transmitter location, receiver location and terrain between the transmitter location and the receiver location. Among the most difficult channel characteristics to deal with are those in the context of a moving receiver location in connection with a transmitter which is located close to a number of significant terrain obstacles which may block or reflect the transmitted signal along a multitude of paths between the transmitter and the receiver. Such an environment can cause narrow-band notches in the received spectrum of on the order of 10 kHz to 20 kHz in bandwidth. In the present invention, a multiple-carrier modulation scheme based on a digital polyvector synthesized modulation scheme has been devised which comprises multiple adjacent carriers which are phase modulated to support two bits per Hertz. In the case of narrow-band fade, therefor, less than ten percent of the carriers in a 200 kHz bandwidth is subject to fade to the point of being undetectable. The ten percent error rate occurs in only a small portion of the band and is dispersed within a serial data channel by various coding techniques according to the invention, and errors in the recovered signal are corrected by the use of a mathematically-sophisticated but proven digital error correcting encoding and decoding scheme made practical by the use of coherent modulation and coherent demodulation which takes full advantage of coherency with a co-channel analog fm signal.

Research and analysis has disclosed that the communications channels of interest are also subject to short-delay multipath. Short-delay multipath has the effect of broadband notching (fade) within bandwidths on the order of 80 kHz to 480 kHz. These broadband notches can result in loss of an entire signal in the bandwidth of interest for a period of time corresponding to the time in which a receiver antenna system is within a cell defined by distance of one half wavelength along the signal propagation path (a fade cell). Whereas prior art systems have attempted to address this problem by implementation of extremely broadband (spread spectrum) modulation techniques, in accordance with the invention, broadband notching is mitigated against by interleaving data in time prior to transmission and reciprocally deinterleaving the data after reception so that the data is sufficiently distributed over time that dwell of the receiver within the fade cell is statistically substantially less than the time required to transmit and receive sufficient data signal to recover the information in the blocked signal. Since it is assumed that the receiver is in motion, "picket fencing" associated with conventional fm broadcast stations is virtually eliminated in the case of digital broadcast.

The errors in the digital data appear as burst errors from broadband notches or data dropouts in narrow-band notches over relatively long intervals of time. The resulting increase in error rate based on investigation of channel characteristics for a low velocity receiver (moving about seven meters per second) is about one in one hundred bits.

The specific multipath characterization for broadcast employed in devising the present invention for application in the commercial fm band is based on statistical analysis of samples of data obtained in New York City and San Francisco, which are representative of two worst-case extremes, namely, a transmitter within a crowded urban environment and a transmitter remote from the urban center wherein the receivers are in a crowded urban setting. In both extremes, the receivers are frequently blocked from the transmitter site as the receivers move through the coverage area.

It has been determined that multipath delays resulting from specular reflection or multiple paths caused from various reflective sources is on the order 0.5 microseconds to 20 microseconds. The number of simultaneous paths for all propagation environments is between 2 and 20. Signal suppression relative to free space propagation is between 10 dB and 50 dB, with the statistically worst-case condition for short multipath being delays of 0.5 microseconds to 5 microseconds, signal suppression to 50 dB and three simultaneous paths of signal. These short delays result in cancellation bandwidths of 120 kHz to 480 kHz with a particular worse case multipath condition of a 50 percent probability of occurring within a 50 to 100 foot area in a highly urbanized environment. Movement by a nominal half wavelength (about two meters) within any 100 foot area cures the worst-case multipath condition.

According to the invention, this situation can be mitigated by providing error correction in the data and interleaving with a interleaver size of about 25,000 bits to 100,000 bits, the size being dependent upon the estimated minimum velocity of the receiver. The resulting increased error rate from a broadband fade is on the order of $10^{-2}$. This can be corrected by a long block code of moderate complexity with added bits. A 255-bit long BCH code having 239 data bits is adequate to compensate for the increased bit error rate due to such fade, and an interleaver with 10,000 bits to about 5 Megabits ($1000\times 5000$) as an interleaver block size will spread out the burst errors sufficient that the block code can recover from those errors.

Digital compressed audio programming such as contemplated (Masking-pattern-adapted Universal Sub-band Integrated Coding And Multiplexing, or MUSI-CAM) would provide for example a 24 millisecond long block size in real-time broadcasting so that block codes have particular advantage in the contemplated digital modulation scheme.

Narrow-band multipath fades are readily addressed by providing frequency diversity through the use of multicarrier modulation. Multicarrier modulation inherently increases the baud time of each carrier. For example, in a system according to the one herein devised, the symbol transmission time is in excess of 50 milliseconds. Since only a small member of carriers are degraded from a narrowband notch, only about 10 percent to 20 percent of the data is lost. The result increases the data rate by $2\times 10^{-2}$. The increased error rate can readily be corrected using the BCH cyclic block code as herein proposed. BCH codes are described in standard references, such as *An Introduction to Error-Correcting Codes*, by Shu Lin, Prentice-Hall, 1970, pp. 112-114.

Referring to FIG. 1, there is shown a digital baseband composite of one type of digital polyvector signal 24 in accordance with the present invention. The number of channels and the spectral allocation of each channel is dependent on baud rate and coding. One specific embodiment in which the number of tones is twenty-one tones is shown for illustrative purposes only. The principles apply equally to a specific embodiment of thirty-two tones, which is considered preferable, or to an embodiment of sixteen tones, which may be less complex to implement. In the exemplary embodiment illustrated in FIG. 1 herein, the baseband composite comprises twenty-one tones 26-46, with tones 27-46 each being an integral multiple of a base tone 26 centered at 9.5 kHz. Each tone 26-46 is allocated 9.5 kHz bandwidth for modulation without guard bands in adjacent channels between a frequency of 4.75 Hz and a frequency of 204.25 kHz. The total bandwidth allocation is 199.5 kHz. The bandwidth of 9.5 kHz allocated to each tone is represented by the finite spectral width of each tone.

Each tone 26-46 is vector modulated in accordance with a synthesizing scheme. A vector is assigned to each tone whose phase defines the bit value of that tone. Each vector is encoded with no more two bits by quadrature phase shift keyed (QPSK) modulation. As hereinafter explained, the polyvector QPSK modulation scheme is realized by synthesizing each of the channels by digital signal processing methods so that each of the channels represented by tones 26-46 is phase coherent with each of the other channels and optionally according to the invention, all of the channels 26-46 are phase coherent with a pilot tone or equivalent clock. The exact phasing of the modulated tones is determined by the digital values of the source data. The phase states of each of the tones 26-46 form a single symbol, and all phases of the tones 26-46 change simultaneously at a rate of up to 9500 symbols per second (19 kbaud), which yields a channel capacity of 399 kilobits per second.

A preferred alternative band plan is contemplated to decrease the baud rate. Specifically, a modulation scheme consisting of thirty-two phase-coherent tones with a base tone at 6.25 kHz and phase-coherent higher tones at multiples of 6.25 kHz would provide a total bandwidth occupancy of 200 kHz between 3.175 kHz and 203.175 kHz with a channel capacity of 400 KBPS while employing a baud rate of only 6.25 kilosymbols per second on each channel. In addition to further lengthening the baud time to spread out data, a thirty-two-tone-based multicarrier modulation scheme also has the advantage of potentially-favorable compatibility with digital signal processing equipment which rely on powers of two for multiplication.

Figure 2:
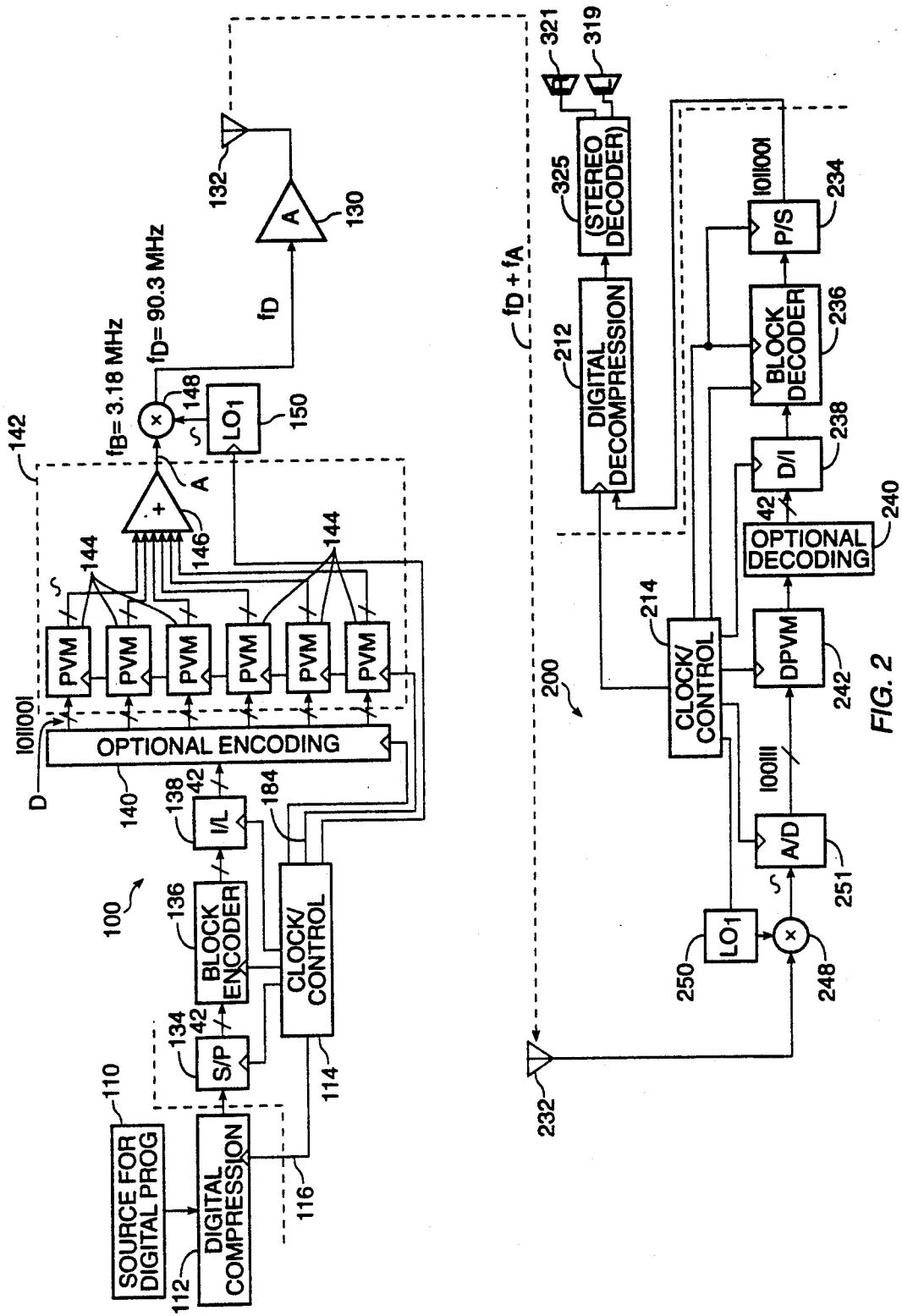
FIG. 2 is a block diagram of a complete broadcast system with a transmitter system and a receiver system according to the invention.

Referring to FIG. 2, there is shown a block diagram of a transmitter system 100 and a receiver system 200 in accordance with one embodiment of the invention. Coupled to the transmitter system is a source 110 of digitized program material, such as digitized audio or data, and particularly if the source material is audio, there is provided a digital compression apparatus 112 to reduce the bandwidth requirements of the audio signal. A suitable audio compressor might operate in accordance with the MUSICAM standard described in U.S. Pat. No. 4,972,484 issued Nov. 20, 1990 in the name of Theile et al.

A central clock and control subsystem 114 is provided as for synchronization of all clock signals, including an input clock signal on clock line 116 to the digital compressor 112. Central clocking and close control of phase assures coherence of the digital and analog portions of the transmission system 100. The central clock and control subsystem 114 may generates a sync signal (not shown) from which a pilot reference or equivalent may be realized.

Digital output of the compressor 112 in the form of a serial bit stream of ones and zeroes is coupled to be applied serially to a serial-to-parallel converter 134. The serial-to-parallel converter 134 transforms the serial bit stream into units of for example 42 bits under synchronous control of the clock control subsystem 114. In another embodiment, the units may consist of exactly 64 bits or 32 bits.

The serial-to-parallel converter 134 is coupled to a block encoder 136 which is synchronized to the clock control subsystem 114. The block encoder 136 preferably operates as follows to encode the input data into an error correcting code of sufficient robustness to correct for narrow band long-interval errors: The block encoder 136 encodes blocks of input data into blocks of output data comprising at least 200 encoded data bits and no more than 20 encoded check bits according to the BCH encoding scheme. A particularly appropriate block code is the BCH (239,255) code, which 239 data bits in a block of 255 bit. This code has been calculated to provide error correction within the specifications of the conditions for a broadcast system of the type suitable for use in the fm broadcast band around 95 MHz in an urban environment. Moreover, a BCH (239,255) code is more than 93% efficient, which is a factor where efficient spectrum. The details of conventional BCH encoding decoding schemes are known in the digital error-correcting coding art, although it is believed that long block codes have in the past been considered to be too long and too complex for practical implementation. Recent advances in circuit and digital signal processing technologies now make it possible to implement commercially practical systems employing long block codes.

The output of the block encoder 136 is applied to an interleaver 138. The interleaver 138 is for distributing the block encoded data over an extended time interval to mitigate against burst errors and other short-interval fading phenomena. An interleaver with a capacity of 10,000 bits to about 5 Megabits (1000 bits by 5000 bits, the exact size being dictated by code word boundaries and the like) as the interleaver block size is deemed suited to provide the time diversity needed to support error correction by the BCH block code within the specifications of the conditions for a broadcast system of the type suitable for use in the broadcast band around 95 MHz in an urban environment. The interleaver 138 may be for example a two-port memory array which accepts data bits written in for example about 1000 input rows and provides as output data read out by columns from about 5000 output columns, to thereby distribute the related data bits over time and to interleave the data bits with others of a different time reference. Appropriate address control is provided to segment the output bits into blocks of the number of bits to be modulated as a symbol in a polyvector multicarrier modulator 142 as hereinafter explained. For example, the multicarrier modulator may receive as input for each single symbol a block of 42, 64 or 32 bits.

The output of the interleaver 138 may be further processed through an optional further encoding module 140. The further encoding module may implement a phase scrambling algorithm such as a Hamming code or Gray-type code to minimize symbol-to-symbol data bit transitions on each channel, or it may be used to implement a data encryption scheme requiring key values to decrypt at a receiver.

The digital output D of the interleaver 138 or optional encoding module 140 is applied to a multicarrier modulation subsystem 142. The resultant output A is an analog signal which is the equivalent of a plurality of equivalent tones which are spaced equally within a bandwidth of for example about 200 Hz, each of the equivalent tones being at a frequency which is an integer multiple of a base frequency tone and each one of said equivalent tones being constrained to be phase coherent with the optional pilot tone. The multicarrier modulation subsystem 142 is coupled to accept the digital output D as the information input for quadrature phase shift key (QPSK) modulating each one of said equivalent tones to distribute digital output D simultaneously over substantially all of said equivalent tones in order to produce a multitone QPSK modulated signal A at a selected intermediate frequency (IF) carrier signal $f_B$.

There are various possible embodiments of the multicarrier modulation subsystem 142. It may be a single 64-input digital signal processing (DSP) module which is operative by fast Fourier transform techniques to synthesize a single sampled-data time domain output, which is applied to a single digital to analog converter producing a composite multitone modulated signal at a carrier frequency.

Figure 3:
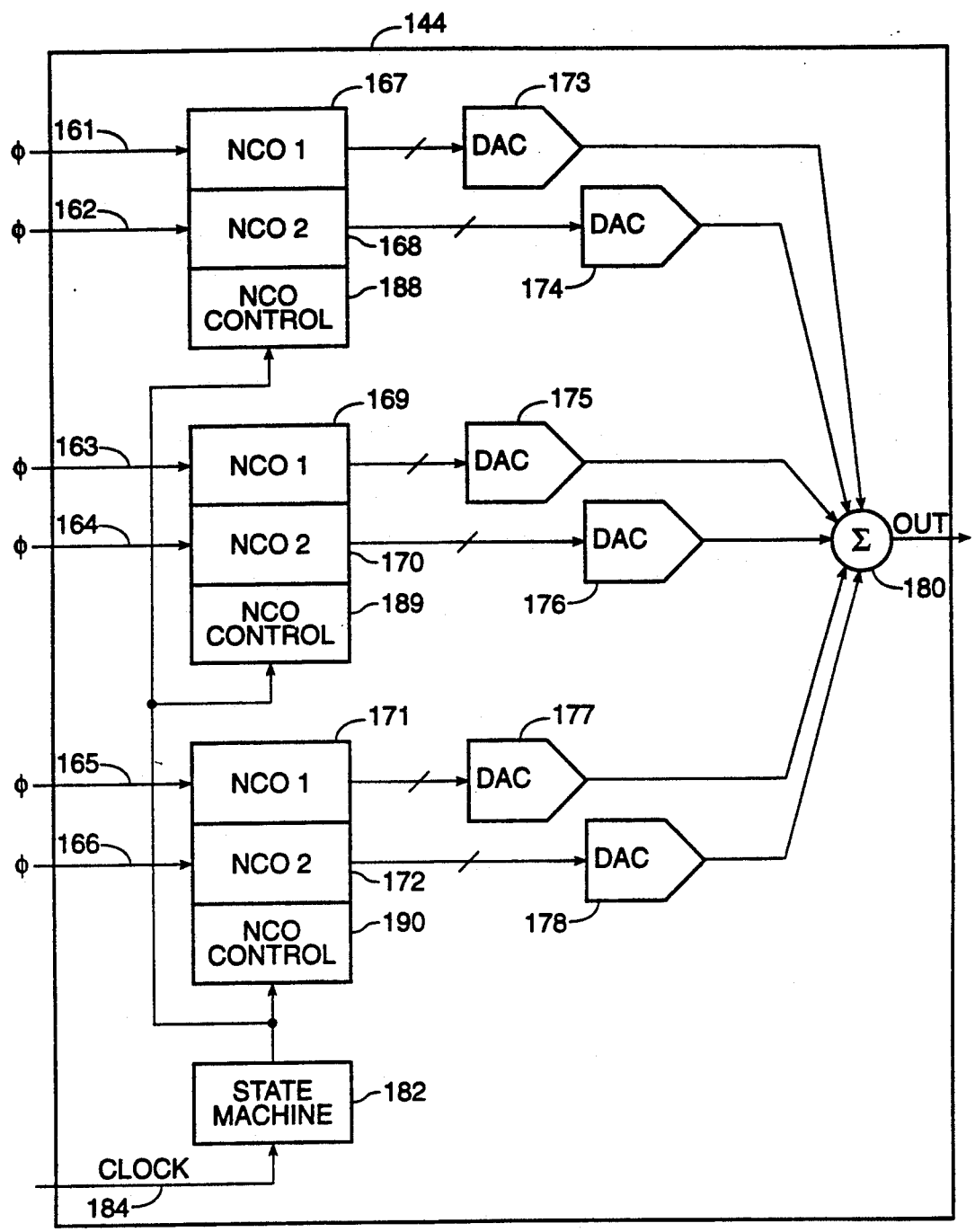
FIG. 3 is a block diagram of a polyvector modulator according to one embodiment of the invention.

Alternatively, the multicarrier modulation subsystem may be a bank of polyvector modulators 144, as shown in FIG. 3, and explained hereinafter, producing analog signal outputs at selected carrier frequencies around the baseband frequency $f_B$ and which are linearly combined in a summer 146 and supplied as an analog signal A wherein each of the tones are phase synchronous with one another.

In any event, the resultant phase-synchronous signal A at carrier frequency $f_B$ is translated by means of a multiplier 148 driven by a phase-synchronous local oscillator 150 to produce an analog signal which carries digitized information in the fm broadcast band $f_D$ and which may share part or all of the spectrum or is at least near or adjacent the frequency of other signals in the fm broadcast band. The so-called "digital" signal $f_D$, which is internally phase coherent, is applied to the amplifier 130 and hence to the transmission antenna 132, by which it is radiated through free space to receivers, such as receiver system 200.

FIG. 3 is a block diagram illustration of a single PVM module 144 according to the invention. The PVM module 114 illustrated herein provides processing for six channels of input data, each channel input having a value of either a one or a zero, representing a phase state $\phi$ of $\pi$ or $2\pi$ (which is the same as 0). Thus, four modules 144 are needed to produce 21 tones of modulated output ($6 \times 4 = 24$) with three extra channels, and six modules 144 are needed to produce 32 tones of modulated output, leaving four extra channels. Alternatively, the PVM module 144 may be a four-tone card such that six cards are required to produce 21 tones ($4 \times 6 = 24$) with three extra channels. As shown, six inputs 161, 162, 163, 164, 165, 166 are provided to six numerically-controlled oscillators (NCOs) 167, 168, 169, 170, 171, 172, which in turn are coupled to respective digital to analog converters (DACs) 173, 174, 175, 176, 177, 178. The NCOs 167-172 are each coupled to receive a single digital bit input and are operative to produce an output in digital form which, when converted and integrated over time by the DACs 173-178 are quadrature-phase modulated tones, each of the tones centered at a different but related frequency according to position in the array of tones. The modulated tones are linearly combined in real time by a summer 180 and then fed to the module summer 146 (FIG. 2). A state machine 182 associated with the module 144 receives the clock signal on clock line 184 (FIG. 2) and provides the synchronization and control signals to each of the NCOs 167-172 through NCO controllers 188, 189, 190. The NCOs 167-172 each produce a stable (digital) parallel bit stream from which the tone waveform can be synthesized for one symbol period (1/9500 secs for a twenty-one channel system, 1/6250 secs for a 32 channel system, etc.) Sampling of each 9.5 kHz modulated tone at a nominal 3.18 MHz carrier may be at about 608 kilosamples/sec. There may be bandpass filters in the transmitter (not shown) and may be needed to remove parasitic and spurious signals.

The digital signal which is synthesized by each PVM module 144 according to the invention is realized in accordance with the following equation. The equation is general for any digital polyvector modulated multitone system in accordance with the invention:

$$DPVM(nT) = \sum_{j=1}^{J} [(A_j/\sqrt{2})u_{Ij}(nT)\cos(\omega_j nT + \pi/4) +$$

$$(A_j/\sqrt{2})u_{Qj}(nT)\sin(\omega_j nT + \pi/4)$$

where:
 DPVM(nT) is the digital output of the PVM module at sample number "n" of time interval "T" which can be converted directly into an analog signal with J tones at frequencies $\omega_j$, where j=1,2,3, etc.;
 j is the index of the tone number (1 to 21, 1 to 32);
 $A_j$ is the amplitude of each channel j, a constant;
 $\omega_j$ is the selected tone frequency
 $u_{Ij}$ is the input modulation of the in-phase component of the complex signal having values of only +1 or −1 (derived from 1 or 0 on input lines 161-166 and represent the phases 0 or $2\pi$ and $\pi$ or $3\pi/2$;
 $u_{Qj}$ is the input modulation of the quadrature-phase component of the complex signal having values of only +1 or −1 (derived from 1 or 0 on input lines 161-166 and represent the phases 0 or $2\pi$ and $\pi$ or $3\pi/2$;

The phase is offset by $\pi/4$ to aid in detection;
 $\omega_j$ is the frequency of the jth tone.

The sample numbers are n=0, 1, 2, 3, etc. The value nT is at an exemplary high sample rate (608 ksym/s at a selected intermediate frequency) to provide sufficient resolution for a 200 kHz bandwidth. The values nT map to the analog time variable t upon processing by a digital to analog converter.

Referring again to FIG. 2, the elements of a receiver 200 according to the invention are illustrated. A conventional antenna 232 is coupled to receive the signal $f_D$.

The clock/control 214 may be used to control the coherent translation of the signal to an intermediate frequency for easier processing. A local oscillator 250 and mixer 248 may be provided for this purpose.

It is preferred according to the invention to process the digitally-modulated signal in a sampled digital domain in real time. An analog to digital filter 251 is provided to convert the signal into a parallel digital bit stream.

In accordance with the invention, a polyvector demodulator 242 is provided to process the digital data stream in the second signal path as a replica of the multitone QPSK modulated signal coherently with a reference, such as a reconstructed pilot tone or clock referred to the base frequency of the lowest order tone or to some tone in between or to a separate pilot tone or equivalent derived clock (typically as a clock signal from clock/control 213) to coherently demodulate the replica of the multitone QPSK modulated signal into a replica of the digital representation of the block encoded signal. According to the invention, DSP techniques may be used. In a demonstration system a type-VE-32C-01V signal processing module manufactured by Valley enterprises of Tamaqua, Pennsylvania was programmed to process a fast Fourier transform of the data stream into individual channels of data from which the phase information representing the binary digital modulation was directly derived. In a consumer receiver, a low-cost set of standard DSP chips, such as a supplied by Texas Instruments, may be used. Alternatively, custom semiconductor devices may be employed to synthesize the processor and reduce the cost.

There follows the DPVM unit 242 an optional decoding module 240 which is matched to the optional encoding module 140. A deinterleaver 238 matched to the interleaver 138 reorders the data bits in time, and a block decoder 236 matched to the block encoder 136 recovers the digital program material to the extent it is correctable within the error tolerance of the selected block code. The BCH code selected is particularly robust for this purpose. The combination of the deinterleaver and the block decoder makes it possible to decode the digital representation of the block encoded signal into output program material with correction of selected short-interval-dependent data errors, narrow-band frequency-dependent data errors and long-interval broadband frequency dependent data errors, such as induced by multipath effects. A parallel-to-serial converter 234 produces the desired digital bit stream, which can then be applied to a digital decompressor 212 and to an optional stereo decoder 325 (for audio program material) which drives an audio output system represented by loudspeakers 319 and 321.

The invention has now been explained with reference to specific embodiments. Other embodiments will be apparent to those of ordinary skill in the art in light of this disclosure. The invention is therefore not intended to be limited, except as indicated by the appended claims.

What is claimed is:

1. A system for broadcast transmission and reception of digitized program material, said broadcast system comprising:

a transmitter system comprising:
  first signal processing means coupled to accept digitized program material from a source of digitized program material for encoding said digitized program material according to a BCH code having at least 200 data bits and no more than 20 check bits to produce a digital representation of a block encoded signal;
  second signal processing means for generating an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone, said second signal processing means being coupled to accept said digital representation of said block-encoded signal for quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal; and
  means for translating said intermediate frequency carrier signal to an output carrier and broadcasting said output carrier through atmospheric free-space; and a plurality of receivers, each receiver comprising:
  means for acquiring a replica of said multitone QPSK modulated block encoded signal through atmospheric free-space, said atmospheric free-space being subject to multipath such that said replica is inclusive of transmission errors;
  third signal processing means coupled to receive said replica of said replica of said multitone QPSK modulated block encoded signal for coherently demodulating said replica of said multitone QPSK modulated signal into a replica of said block encoded signal; and
  fourth signal processing means for decoding said replica of said digital representation of said block encoded signal into output program material with correction of selected short-interval-dependent data errors, narrow-band frequency-dependent data errors and long-interval broadband frequency dependent data errors, such as induced by multipath effects, said output program material being a substantial duplicate of said digitized program material.

2. The system according to claim 1, wherein said BCH block code is a type having 239 data bits in a 255 bit block.

3. The system according to claim 1 wherein said first signal processing means further includes means for interleaving in time said block encoded digitized program material to temporally spread said program material and wherein said fourth signal processing means includes means for deinterleaving in time said program material with correction bits in order to enhance resistance to said selected short-interval-dependent data errors.

4. The system according to claim 3 wherein said second signal processing means comprises a digital signal processing means employing a fast Fourier transform.

5. A transmitter system for a system for broadcast transmission and reception of digitized program material, said transmitter system comprising:

first signal processing means coupled to accept digitized program material from a source of digitized program material for encoding said digitized program material according to a BCH code having at least 200 data bits and no more than 20 check bits to produce a digital representation of a block encoded signal;
second signal processing means for generating an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone, said second signal processing means being coupled to accept said digital representation of said block-encoded signal for quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal; and
means for translating said intermediate frequency carrier signal to an output carrier and broadcasting said output carrier through atmospheric free-space.

6. The transmitter according to claim 5 wherein said first signal processing means further includes means for interleaving in time said block encoded digitized program material to temporally spread said program material in order to enhance resistance to said selected short-interval-dependent data errors.

7. The transmitter according to claim 5, wherein said BCH block code is a type having 239 data bits in a 255 bit block.

8. A receiver system for a system for broadcast transmission and reception of digitized program material in the form of a multitone QPSK modulated signal, wherein said digitized program material is encoded according to a BCH block code having at least 200 data bits and no more than 20 data bits in a block encoded signal, said receiver system comprising:

means for acquiring a replica of said multitone QPSK modulated block encoded signal through atmospheric free-space, said atmospheric free-space being subject to multipath such that said replica is inclusive of transmission errors;

first signal processing means coupled to receive said replica of said replica of said multitone QPSK modulated block encoded signal for coherently demodulating said replica of said multitone QPSK modulated signal into a replica of said block encoded signal; and second signal processing means for decoding said replica of said digital representation of said block encoded signal into output program material with correction of selected short-interval-dependent data errors, narrow-band frequency-dependent data errors and long-interval broadband frequency dependent data errors, such as induced by multipath effects, said output program material being a substantial duplicate of said digitized program material.

9. The receiver system according to claim 8, wherein said block encoded signal is further interleaved in time according to an interleaving scheme, said receiver further comprising:

means for deinterleaving in time said program material with correction in order to enhance resistance to said selected short-interval-dependent data errors.

10. The receiver system according to claim 8, wherein said BCH block code is a type having 239 data bits in a 255 bit block.

11. The system according to claim 8 wherein said second signal processing means comprises a digital signal processing means employing a fast Fourier transform.

12. A method for transmitting, in a broadcast transmission and reception system, digitized program material, said method comprising the steps of:

encoding, in first signal processing means coupled to accept digitized program material from a source of digitized program material, said digitized program material according to a BCH code having at least 200 data bits and no more than 20 check bits to produce a digital representation of a block encoded signal;

generating an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone, and quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal;

translating said intermediate frequency carrier signal to an output carrier; and broadcasting said output carrier through atmospheric free-space.

13. The method according to claim 12 wherein said further including the step of interleaving in time said block encoded digitized program material to temporally spread said program material in order to enhance resistance to said selected short-interval-dependent data errors.

14. The method according to claim 12, wherein said BCH block code is a type having 239 data bits in a 255 bit block.

15. A method for receiving an analog signal and digitized program material in the form of a multitone QPSK modulated signal, wherein said digitized program material is encoded according to a BCH block code having at least 200 data bits and no more than 20 check bits in a block encoded signal, said method comprising the steps of:

acquiring a replica of said multitone QPSK modulated block encoded signal through atmospheric free-space, said atmospheric free-space being subject to multipath such that said replica is inclusive of transmission errors;

coherently demodulating said replica of said multitone QPSK modulated signal into a replica of said block encoded signal; and decoding said replica of said block encoded signal into output program material with correction of selected short-interval-dependent data errors, narrow-band frequency-dependent data errors and long-interval broadband frequency dependent data errors, such as induced by multipath effects, said output program material being a substantial duplicate of said digitized program material.

16. The method according to claim 15, wherein said block encoded signal is further interleaved in time according to an interleaving scheme, said method further comprising:

deinterleaving in time said program material with correction in order to enhance resistance to said selected short-interval-dependent data errors.

17. The method according to claim 15, wherein said BCH block code is a type having 239 data bits in a 255 bit block.

* * * * *